Patented Sept. 16, 1930

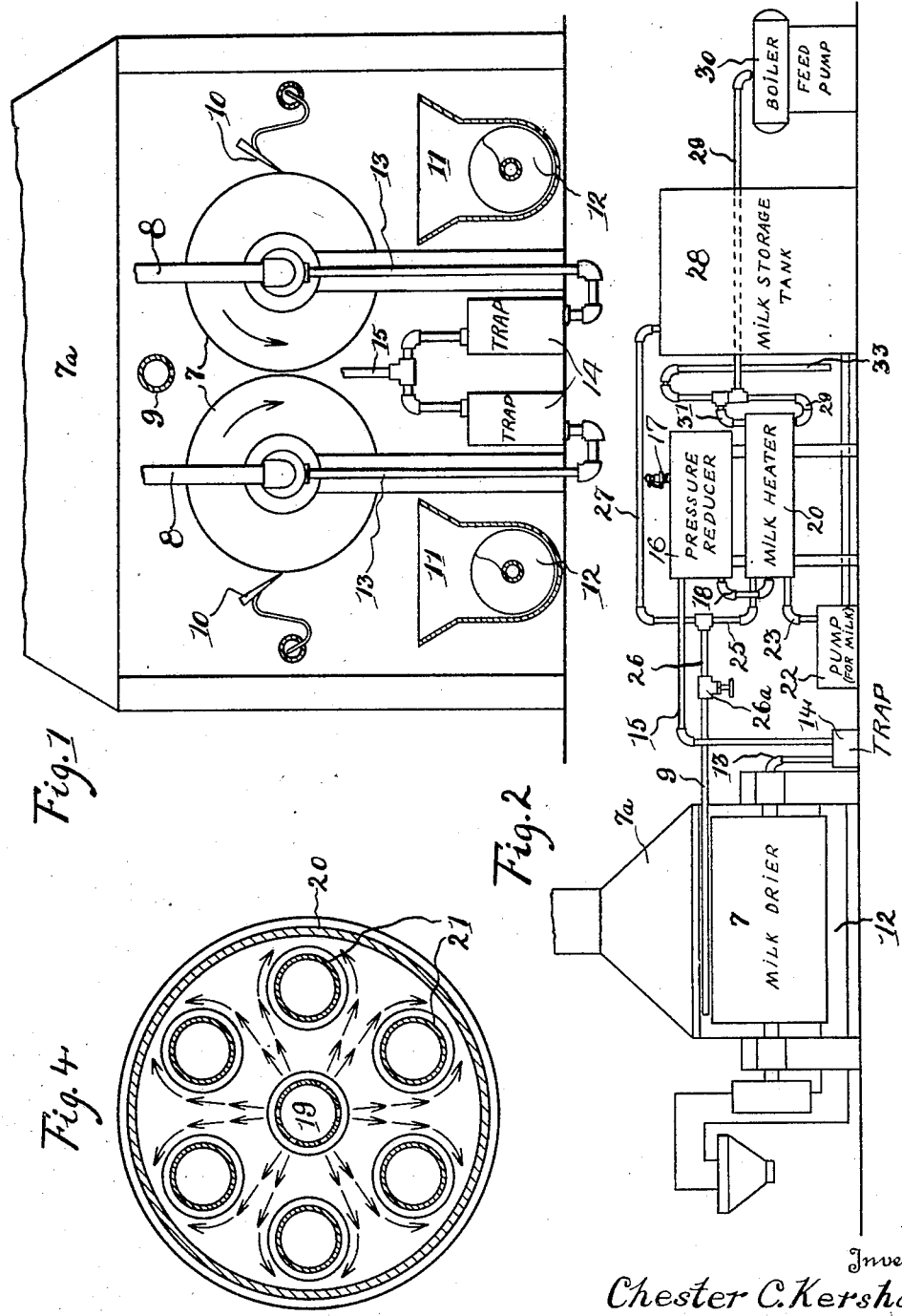

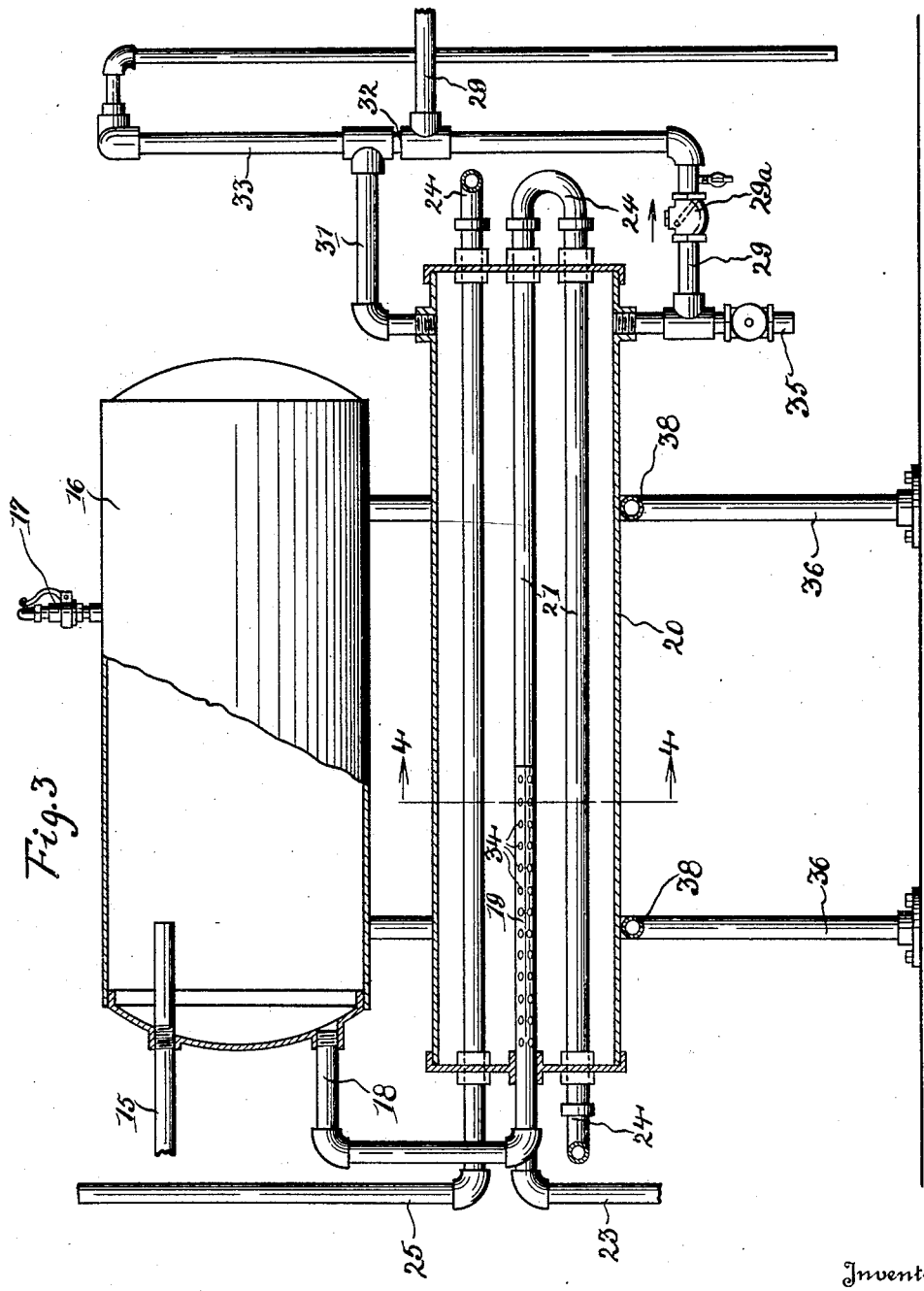

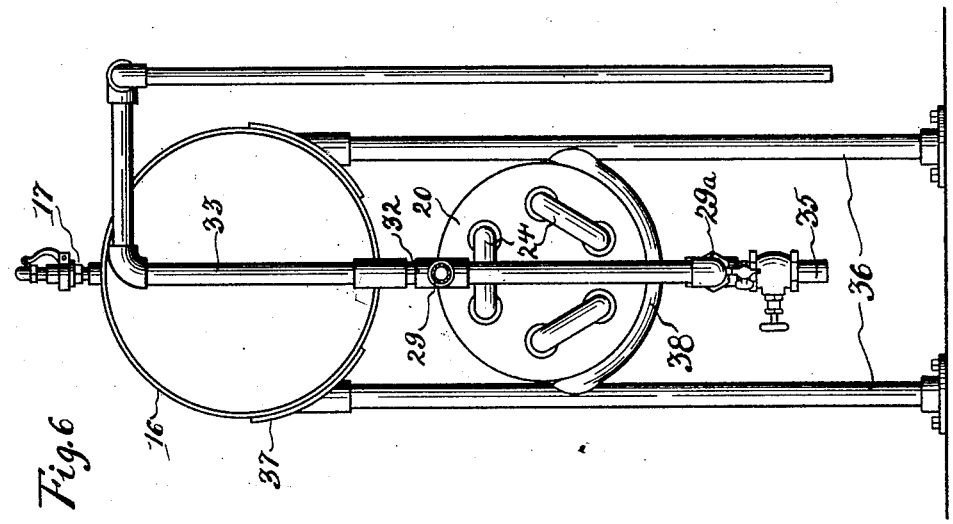
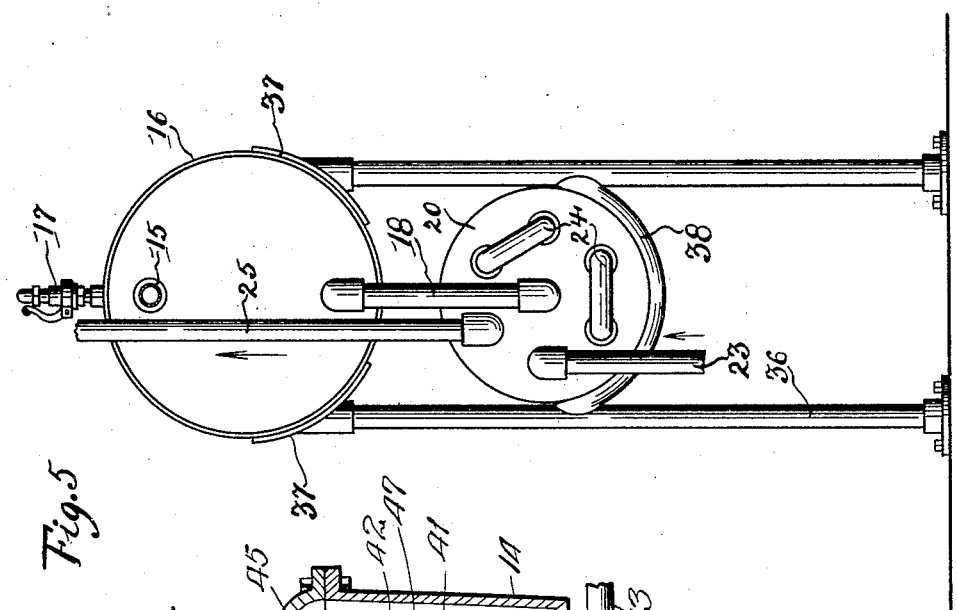
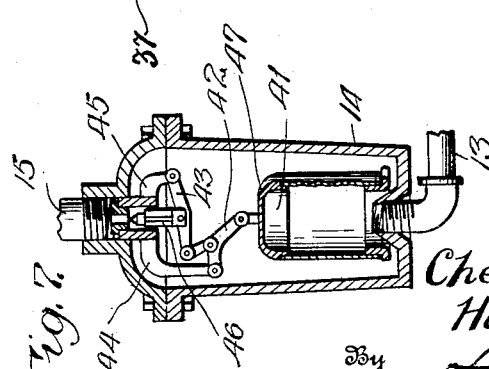

1,776,030

UNITED STATES PATENT OFFICE

CHESTER C. KERSHAW, OF ST. PAUL, AND HAROLD L. SOLIE, OF MINNEAPOLIS, MINNESOTA

MEANS AND METHOD OF CONSERVING HEAT IN MILK DRIERS

Application filed May 10, 1929. Serial No. 361,952.

In milk drying plants of the type in common use the milk is delivered to the outer periphery of cylindrical driers which are heated from within by steam under pressures as high as about 95 pounds per square inch. This invention relates particularly, although not exclusively, to the utilization of the condensate from such driers to preheat the milk and to generally improve the efficiency of the plant.

The difficulties attendant upon the use of the condensate to preheat the milk have been such that many of the milk drying plants have heretofore wasted a large part of the heat in the condensate. One of the chief difficulties is that the condensate at a high temperature (often above 300° F.) when brought in contact with pipes or other containers of the milk causes the milk to solidify and adhere or "cook on" to the hot surfaces, thus clogging the passages and burning the product. Heretofore, it has been common practice to allow the exhaust from the condensate traps to merely pass off into the atmosphere.

It is our object to utilize the heat thus wasted to preheat the milk in a manner which avoids the solidification and scorching of the milk and requires only simple and inexpensive apparatus.

In the accompanying drawings we have illustrated the best form of our invention at present known to us. Referring to the drawings, Figure 1 is a diagrammatic end view of a drier of common type; Fig. 2 is a diagrammatic side elevation of the same showing our improved heat conserving means connected thereto; Fig. 3 is an enlarged side elevation of the principal parts of our improved apparatus, partially in central vertical section; Fig. 4 is a transverse section through the milk heater taken on the line 4—4 of Fig. 3; Fig. 5 is an end elevation of the apparatus as viewed from the left of Fig. 3; Fig. 6 is an elevation as viewed from the right of Fig. 3, and Fig. 7 is a central vertical section through a suitable trap for use in connection with our invention.

The drier shown diagrammatically in the drawings has a pair of cylinders 7 which are rotated in the direction indicated by arrows in Fig. 1 and heated by steam supplied under pressure through pipes 8 in well known manner. The peripheries of the cylinders 7 are disposed in close proximity to each other so that a trough is formed between them into which the milk to be dried is delivered by a pipe 9. A film of milk adheres to the lower periphery of the cylinders 7 and as they rotate this film dries and is removed from the periphery by longitudinally disposed scrapers 10, the dry material falling into suitable troughs 11 and being carried out of the driers by suitable conveyors 12 located in the bottom of the trough 11. Vapor rising from the drier is collected in a suitable hood 7ª and conducted away therefrom.

A condensate withdrawal pipe 13 communicates with the interior of each of the cylinders 7 and conducts the condensate to a suitable trap 14. Details of a suitable trap are shown in Fig. 7. The pipe 13 communicates with the bottom of the trap and the pipe 15 communicates with the top thereof. The passage into the pipe 15 is provided with a closure 40 operatively connected to a float 41 of bell shape. The float 41 is arranged to cap the inlet opening from the pipe 13 and motion is transmitted from the float 41 to the closure 40 through levers 42 and 43 which are pivotally supported on the lower ends of rigid bracket arms 44 and 45, respectively. A link 46 connects the lever 42 with the lever 43 so that when the float 41 rises the closure 40 is moved to closed position, otherwise water may flow from the pipe 13 past the open closure 40 to the pipe 15. In the normal operation of the drier steam is delivered intermittently to the trap 14 and when a quantity of steam is received in the trap it displaces the water in the float 41 and causes said float to rise with the result that the pipe 15 is closed until the steam is condensed or escapes when the outlet passage again opens by the falling of the float. A small vent 47 is provided in the top of the float 41 to permit the gradual escape of air or steam therefrom. From the traps 14 a pipe 15 is arranged to transmit condensate to our improved apparatus for utilizing the heat therein to preheat the milk supplied to the pipe 9. The pipe 15 delivers the condensate at the high pressure of the cylinders 7 to a pressure reducing tank 16 where the sudden fall of the pressure causes a substantial part of the condensate to flash into steam. This tank 16 is of stout construction adapted to withstand the sudden pulsations caused by the intermittent delivery of the condensate from the traps 14. As a precautionary measure, to eliminate danger in case of a stoppage in the outlet connections, a pressure relief valve 17 is provided on the tank 16. This tank 16 is designed to reduce the pressure substantially to atmospheric. Obviously such reduction in pressure is accompanied by a reduction in the temperature of the condensate to about 212 degrees Fahrenheit and in practice we have found that the variation in temperature may be as great as 5% more or less than 212 degrees Fahrenheit. An outlet pipe 18 communicates with the lower part of the tank 16 at one end and connects with a distributing pipe 19 extending axially within a milk heater having a casing 20. Within the cylindrical outer casing 20 is a coil 21 through which milk is forced by a pump 22 (Fig. 2). Connecting the coil 21 with the pump is a pipe 23. The several sections of the coil 21, extending within the heater casing 20, are joined together in a continuous conduit by U-shaped connections 24 projecting from the ends of the casing 20. The outlet from the coil 21 comprises a pipe 25 having a valved branch 26 communicating with the pipe 9, and another branch 27 constituting an overflow to return any excess of milk to a storage tank 28 (Fig. 2).

The outlet from the casing 20 for condensate comprises a pipe 29 communicating with the bottom of the casing 20 and extending upward to a point above, or about at the top of, the casing 20 where it passes to a boiler feed pump 30 or other place of disposal for the condensate. A check valve 29ª is provided to prevent flow back into the casing 20 through the pipe 29. To prevent the trapping of air, steam or the like within the casing 20 a vent pipe 31 is connected to the top of the casing 20 and has a branch 32 communicating with the condensate delivery pipe 29. A second branch 33 of the pipe 31 has a rising portion and then extends downward to waste the excess condensate in the event that it is formed more rapidly than it is drawn off from the pipe 29.

One of the important features of our invention is the arrangement for so distributing the fluid from the pipe 19 that it does not impinge directly on the pipes of the coil 21. As best shown in Figs. 3 and 4, the distributing pipe 19 has a number of perforations 34 therein which direct streams of condensate and steam at substantially atmospheric pressure between the several pipes of the coil 21 as indicated by arrows in Fig. 4. In the absence of such arrangement, the fluid from the pipe 19, which is at temperatures ranging from about 210 degrees Fahrenheit to about 220 degrees Fahrenheit, would be apt to cause the milk in the coil 21 to adhere at the points of impingement and gradually collect causing the objectionable "cooking on" of the milk and ultimate clogging or stoppage of the coils 21.

To facilitate emptying the casing 20 a valved branch 35 is provided on the pipe 29, as shown in Fig. 3. Standards 36 afford suitable supports for the tank 16, casing 20 and connections, suitable brackets 37 being secured on the upper ends of the standards 36 to engage the tank 16 and arcuate cross members 38 affording supports for the casing 20.

*Operation*

In the operation of our apparatus, the pipe 15 delivers condensate intermittently from the traps 14 to the tank 16 where the pressure of about 90 to 95 pounds per square inch upon the fluid is reduced substantially to atmospheric and a part of the condensate flashes into steam. The sensible heat in the condensate and latent heat of the steam so formed is now utilized to heat the milk passing through the coil 21. Thus the pipes 18 and 19 draw off the steam and condensate from the tank 16 and the openings 34 in the pipe 19 so distribute the hot fluid that it does not directly impinge against the coil 21 but is circulated between the pipes. The casing 20 is maintained substantially filled with condensate by our arrangement of the withdrawal pipe 29 which traps the water in the casing. The vent pipe 31 prevents the accumulation or trapping of air or steam within the casing 20. The pump 22 continuously supplies the drying cylinders 7 with milk through the pipe 23, coil 21 and pipes 25, 26 and 9, the flow from the latter pipe being controlled by a valve 26ª.

We have found in practice that our invention operates successfully to conserve the greater part of the heat in the condensate which has heretofore been wasted, the heat thus saved being utilized to increase the rate of drying of the milk to a substantial degree.

It is to be understood that the expression "about 212 degrees Fahrenheit" in the following claims is intended to include variations of approximately 5% more or less than 212 degrees Fahrenheit.

Having described our invention what we claim as new and desire to protect by Letters Patent is:

1. The combination with a milk drier employing steam at temperatures above 212 degrees Fahrenheit, of apparatus for utilizing the condensate from said drier to preheat the milk, comprising an expansion tank, a milk heater, connections for transmitting the condensate from the drier successively to said expansion tank and to said heater, said tank being adapted to reduce the temperature of said condensate to about 212 degrees Fahrenheit and to allow the formation of steam therefrom, and means for passing the milk through said heater to the drier to utilize the latent heat in the stream formed in said expansion tank.

2. The combination with a milk drier employing steam at temperatures not less than about 300 degrees Fahrenheit, of apparatus for utilizing the condensate from said drier to preheat the milk, comprising an expansion tank, a milk heater, connections for transmitting the condensate from the drier successively to said expansion tank and heater, said tank being adapted to reduce the temperature of said condensate to about 212 degrees Fahrenheit and to allow the formation of steam therefrom, means in said heater for distributing the steam delivered thereto to prevent solidification of the milk therein and means for passing the milk through said heater to the drier to utilize the latent heat in the steam formed in said expansion tank.

3. The combination with a milk drier employing steam under pressure, of apparatus for utilizing the condensate from said drier to preheat the milk, comprising an expansion tank, a milk heater, said heater having a coil for milk, connections for transmitting the condensate from the drier successively to said expansion tank and heater, said tank being adapted to reduce the pressure and temperature of the condensate and allow the formation of steam therefrom, and means for passing the milk through said coils into the drier to utilize the latent heat in said steam formed in said expansion tank.

4. The combination with a milk drier employing steam under pressure, of apparatus for utilizing the condensate from said drier to preheat the milk, comprising an expansion tank, a milk heater, having a casing and a coil in said casing, connections for transmitting the condensate from the drier successively to said expansion tank and casing of the heater, said tank being adapted to reduce the pressure and temperature of said condensate and allow the formation of steam therefrom, distributing means for the condensate within said heater adapted to direct the fluid between the coils, means for maintaining said casing substantially filled with condensate and means for passing the milk through said coil into the drier to utilize the latent heat in the steam formed in said expansion tank.

5. The combination with a milk drier employing steam under pressures substantially above atmospheric pressure, of apparatus for utilizing the condensate from said drier to preheat the milk, comprising an expansion tank, a milk heater having a cylindrical casing and a coil in said casing, connections for transmitting the condensate from the drier successively to said expansion tank and casing of the heater, said tank being adapted to reduce the pressure of said condensate to about atmospheric pressure and to allow the formation of steam therefrom and distributing means for the condensate within said heater adapted to direct the fluid between the coils, said means having a perforated pipe extending axially in said casing, and means for passing the milk through said coils into the drier to utilize the latent heat in the steam formed in said expansion tank.

6. The method of conserving heat in milk driers or the like employing steam at pressures substantially above atmospheric, and having a coil for preheating the fluid to be dried, which consists in withdrawing the condensate from the drier, reducing the pressure and temperature of said condensate to form steam and utilizing the latent heat in said steam by circulating said steam and the remaining condensate about said coil to preheat said fluid preparatory to drying the same while distributing said steam about said coil to prevent local solidification of the contents of said coil.

7. The method of conserving heat in milk driers or the like employing steam at pressures substantially above atmospheric, and having a coil for preheating the fluid to be dried, which consists in withdrawing the condensate from the drier, reducing the pressure and temperature of said condensate to form steam and circulating said steam and the remaining condensate about said coil to preheat said fluid preparatory to drying the same, while maintaining said coil submerged in the condensate.

In testimony whereof, we have hereunto signed our names to this specification.

CHESTER. C. KERSHAW.
HAROLD L. SOLIE.